United States Patent
Grunick

(10) Patent No.: US 9,792,378 B2
(45) Date of Patent: Oct. 17, 2017

(54) COMPUTERIZED SYSTEMS AND METHODS FOR IDENTIFYING A CHARACTER STRING FOR A POINT OF INTEREST

(71) Applicant: MapQuest, Inc., Denver, CO (US)

(72) Inventor: Miria Grunick, New York, NY (US)

(73) Assignee: Mapquest, Inc., Denver, CO (US)

( * ) Notice: Subject to any disclaimer, the term of this patent is extended or adjusted under 35 U.S.C. 154(b) by 516 days.

(21) Appl. No.: 14/067,893

(22) Filed: Oct. 30, 2013

(65) Prior Publication Data

US 2015/0120756 A1 Apr. 30, 2015

(51) Int. Cl.
*G06F 17/30* (2006.01)

(52) U.S. Cl.
CPC .. *G06F 17/30876* (2013.01); *G06F 17/30241* (2013.01)

(58) Field of Classification Search
CPC .................. G06F 17/30241; G06F 17/30867
USPC ............. 707/748, E17.008, 999.03; 701/537
See application file for complete search history.

(56) References Cited

U.S. PATENT DOCUMENTS

| | | | |
|---|---|---|---|
| 2008/0134088 A1* | 6/2008 | Tse ........................ | G06F 3/0481 715/810 |
| 2011/0029398 A1* | 2/2011 | Boudville ........... | G06F 17/3087 705/26.1 |
| 2012/0123876 A1* | 5/2012 | Sista .................. | G06Q 30/0277 705/14.73 |
| 2013/0125005 A1* | 5/2013 | French .............. | G06F 17/30864 715/738 |
| 2013/0151637 A1* | 6/2013 | Bedikian ................. | H04L 67/22 709/206 |
| 2013/0166207 A1 | 6/2013 | Shao et al. | |
| 2013/0198296 A1* | 8/2013 | Roy ..................... | G06Q 10/107 709/206 |
| 2014/0108522 A1* | 4/2014 | Gersh .................... | G06Q 50/01 709/204 |
| 2014/0310365 A1* | 10/2014 | Sample ................ | G06Q 10/107 709/206 |
| 2014/0316913 A1* | 10/2014 | He ...................... | H04L 67/2804 705/14.73 |
| 2014/0317516 A1* | 10/2014 | Doubleday ............ | G01C 21/32 715/738 |
| 2015/0073709 A1* | 3/2015 | Huang ................. | G01C 21/206 701/537 |

OTHER PUBLICATIONS

Pereira, F. et al., "Perspectives on semantics of the place from online resources", 2009 IEEE International Conference on Semantic Computing, Sep. 14, 2009, pp. 215-220, 6 pages.

(Continued)

*Primary Examiner* — Baoquoc N To

(57) ABSTRACT

Computerized systems and methods are provided for identifying a character string for a point of interest. In accordance with some embodiments, point of interest information, including a universal resource locator (URL) is received, and a document associated with the URL is retrieved. The document is parsed to identify a set of character strings. A subset of character strings from the set is isolated. A character string is identified from the subset of character strings and associated with the POI information to thereby enable improved processing of queries and POI information retrieval.

20 Claims, 4 Drawing Sheets

(56) References Cited

OTHER PUBLICATIONS

Alves, A. O., "Semantic Enrichment of Places, Understanding the meaning of public places from natural languages texts", University of Coimbra Postgraduate Colloquium Series, Feb. 24, 2012, 27 pages.
Alves, A. O. et al., "Place Enrichment by Mining the Web", Ambient Intelligence, Springer Berlin Heidelberg, Nov. 11, 20009, pp. 66-77, 12 pages.
International Search Report and Written Opinion mailed on Jan. 30, 2015 in International Application No. PCT/US2014/060814, 10 pages.

* cited by examiner

COMPUTERIZED SYSTEMS AND METHODS FOR IDENTIFYING A CHARACTER STRING FOR A POINT OF INTEREST

BACKGROUND

Technical Field

The present disclosure relates to computerized data processing and mapping and information retrieval technologies. More particularly, and without limitation, the present disclosure relates to computerized systems and methods for identifying one or more character strings to associate with a point of interest for use in future queries for information.

Background

Online mapping and information retrieval services have grown significantly in recent years. People now can submit queries and access information using a variety of devices, such as personal computers, laptops, tablets, personal digital assistants (PDAs), mobile phones, smart-phones, televisions, geographical positioning system (GPS) navigation devices, and other devices. Queries for information can be performed locally on a device, or over a network such as the Internet. With increased access to such technologies over a wide variety of devices, people have become more reliant than ever on applications and services for accessing desired information.

One type of information that is commonly sought by users is information related to a point of interest (POI). A POI may be, for example, a specific entity or attraction in a specific geographical location. A POI may be useful or interesting to one or more individuals, or that one or more individuals may wish to visit. By way of example, a POI may represent a tourist attraction, gas station, rest area, hotel, restaurant, museum, hospital, historical site, house for sale, etc. A POI may also correspond to a movie theater showing a particular film, a restaurant that serves a specific type of food, such as pizza, etc.

A user may submit a query for a POI using a variety of different electronic applications or online services. For example, POIs can be displayed in electronic or online mapping applications that convey information about roads, traffic, buildings, landmarks, or terrain. Websites may also provide such information, with query fields or pages provided for users. These and other applications may be interactive and may allow a user to access a map of a specific location (e.g., specific address, city, state, country, etc.) and surrounding locations. Such applications may display information regarding POIs located in or near a displayed location to indicate entitles of potential user interest. For example, a map application on a mobile phone or on a GPS device in an automobile may display driving directions for a travel route, and may display and automatically update information about nearby POIs as the user traverses a route. A user may also search for a specific POI and be presented with directions, an estimated distance, and/or an estimated travel time to the POI. Alternatively, a user may submit a query for a POI over the Internet via a website, such as MapQuest™ at www.mapquest.com.

POI information may be gathered from a variety of data providers. The POI information may be stored in one or more relational databases to build searchable indexes of POI information. Data providers may provide information such as a location, address, name, and/or universal resource locator (URL) for one or more of the POIs. This information may then be stored in an index to allow users of the electronic applications to search for the POIs by location, address, or name. Some data providers may also provide additional data for accessing POI information. However, relying on existing solutions and providers is problematic, because information that could be useful in searching for or identifying a relevant POI may not be provided by a data provider. For example, a data provider may provide a location, address, and name of a restaurant, but this information may not be helpful to a user attempting to locate a restaurant that serves a particular menu item.

SUMMARY

Embodiments of the present disclosure provide improved systems and methods for processing queries and retrieving information, such as POI information. In addition, embodiments of the present disclosure provide novel solutions for identifying a character string for associating with a POI.

In accordance with some embodiments of the present disclosure, computerized systems and methods are provided that identify a character string from a URL associated with a POI for associating with the POI. The embodiments presented herein also may be implemented to address one or more of the disadvantages of conventional systems and methods, such as those indicated above.

In accordance with the present disclosure, there is provided a computer-implemented method for identifying a character string for a point of interest or POI. The method comprises receiving information associated with the point of interest, the information including a uniform resource locator (URL), and parsing text from a document associated with the URL, the parsed text including a set of character strings. The method also comprises isolating, by at least one processor, a subset of character strings from the set of character strings by omitting at least a first character string of the set from the subset. The method further comprises identifying, by the at least one processor, a second character string in the subset that has an associated score that meets a predetermined threshold, and associating the identified second character string with searchable information for the point of interest.

Furthermore, in accordance with the present disclosure, there is provided a computer system for identifying a character string for a point of interest comprising a memory device that stores a set of instructions and at least one processor that executes the set of instructions. The at least one processor is configured to receive information associated with the point of interest, the information including a uniform resource locator (URL), and to parse text from a document associated with the URL, the parsed text including a set of character strings. The at least one processor, when executing the instructions, is also configured to isolate a subset of character strings from the set of character strings by omitting at least a first character string of the set from the subset. The at least one processor, when executing the instructions, is further configured to identify a second character string in the subset that has an associated score that meets a predetermined threshold and to associate the identified second character string with searchable information for the point of interest.

Additionally, in accordance with the present disclosure, there is provided a non-transitory computer-readable medium storing a set of instructions that, when executed by at least one processor, configures the at least one processor to carry out a method. The method comprises receiving information associated with the point of interest, the information including a uniform resource locator (URL), and parsing text from a document associated with the URL, the parsed text including a set of character strings. The method also comprises isolating a subset of character strings from the set of character strings by omitting at least a first character string of the set from the subset. The method further comprises identifying a second character string in the subset that has an associated score that meets a predetermined threshold and associating the identified second character string with searchable information for the point of interest.

Before explaining exemplary embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION OF EXEMPLARY EMBODIMENTS

Figure 1:
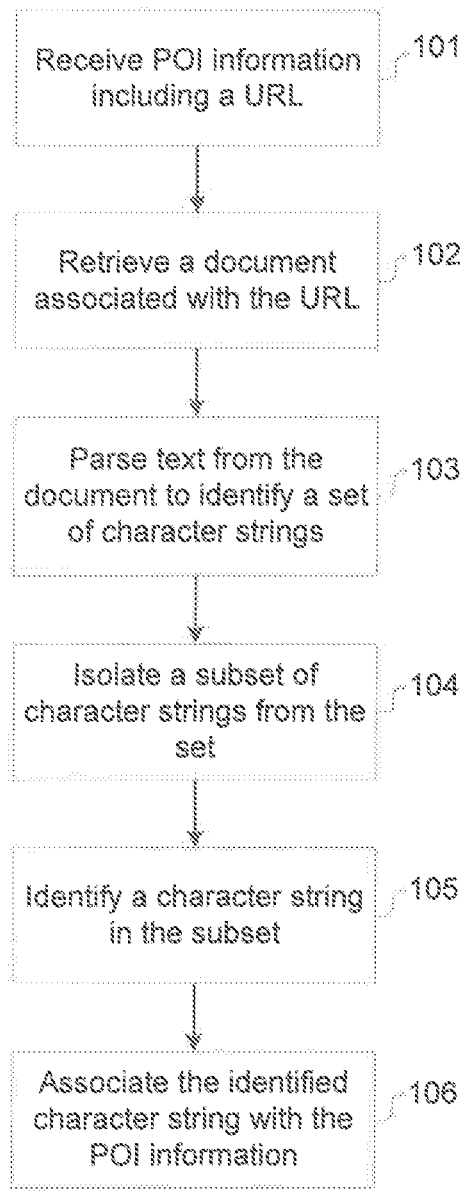
FIG. 1 illustrates an exemplary method for identifying a character string for a point of interest, consistent with embodiments of the present disclosure.

Reference will now be made in detail to the present embodiments of the disclosure, certain examples of which are illustrated in the accompanying drawings.

Embodiments of the present disclosure include systems and methods for processing queries and retrieving information, such as POI information. In addition, embodiments of the present disclosure encompass computer-implemented systems and methods for identifying one or more character strings to associate as key words or key phrases with a POI. Such systems and methods may receive POI information including a URL, and may access and parse a document associated with the URL to identify a set of character strings. A subset of character strings of the set may be isolated by omitting at least a first character string from the subset based on predetermined criteria. A second character string may then be identified from the subset and associated with the POI information to thereby enable improved processing of queries and POI information retrieval.

Embodiments of the present disclosure further encompass computer-implemented systems and methods that can address the problems of conventional services and techniques for identifying and retrieving information, such as POI information. For example, embodiments of the present disclosure provide improved systems and methods that can access a document, such as a web page, associated with a URL, and that can identify one or more character strings, such as key terms or phrases, to associate with the POI. By associating additional character strings with a POI, a search provider can allow a user to search for POIs based on additional terms and/or phrases that were not originally associated with the POI information provided by a data provider. This allows a user to better identify POIs that are relevant to his/her interests. Furthermore, systems and methods consistent with the present disclosure may provide increased customer satisfaction of a provider's or website's services, which may stimulate additional use of these services. This may result in higher revenue for the provider or website through, for example, increased traffic or customer engagement and additional sales of advertising or services.

In accordance with embodiments of the present disclosure, an application or service provider may process user queries for information and identify relevant information in response to the query using one or more databases of indexed or otherwise searchable information. A query may include one or more terms or phrases submitted by a user to identify relevant information from an available pool of information, such as POI information. One or more servers or other computer systems may process a user query submitted over a network, such as the internet. Alternatively, a local device or application may process the user query and provide results based on a local database of information. The information in the local database could be provided at the time of sale of the local device or from a remote source when the device is connected to a network, and could be periodically updated when connected to a network.

In the context of POIs, the POI information may include one or more character strings that describe the POI. For example, the one or more character strings may include terms, words, phrases, or abbreviations, that describe a POI. Each character string may include a sequence of characters. The sequence of characters may include one or more alphanumeric characters and/or any other character commonly entered by a user with a keyboard and/or provided for in a character-encoding scheme, such as American Standard Code for Information Interchange (ASCII) or UCS Transformation Format-8-bit (UTF-8). It will be appreciated from this disclosure that the embodiments and features of this disclosure may be applied to other types of information (e.g., persons, places, things) and other character or string formats may be utilized. For purposes of illustration, however, reference will be made to POI information and examples of alphanumeric character strings to describe the following embodiments of the present disclosure.

A user may search for a POI by entering or submitting a character string as part of a query. Based on the submitted query, the application or service provider may search through the indexed POI information to identify one or more character strings in the indexed POI information that correspond to the entered character string. The application or service provider may then return the identified POI information to the user. Alternatively, a device or application may automatically identify POIs based on a user's location or travel route. For example, a GPS device or application in an automobile or mobile phone may automatically search for POIs within a certain distance of a user's location or travel route.

The application or service provider may receive the POI information from one or more data providers. For example, data providers may collect information on POIs and provide that information to search providers. As noted previously, POI information provided by data providers often contain very little descriptive information on which users can search for the POI. For example, the POI information may include only a location, address, name, and URL of a POI. If the POI is a restaurant, for example, the URL could be a URL for the restaurant's web page. The application or service provider may data mine, or "scrape," one or more documents, such as a web pages, associated with the URL to identify one or more character strings (e.g., terms, words, phrases, keywords) that are descriptive of the POI, and may associate the identified one or more character strings with the POI information for future user queries.

FIG. 1 illustrates an exemplary method 100, consistent with embodiments of the present disclosure. Exemplary method 100 may be implemented in a computing environment (see, e.g., FIG. 3) using one or more computer systems (see, e.g., FIG. 4). In some embodiments, method 100 is performed by one or more web servers or computer systems associated with an application or service provider. The application or service provider may be locally accessible to a user, or may be accessible to the user over a network, such as the Internet.

In step 101 POI information may be received. The POI information may be received from one or more data providers, and may include one or more of a name, location, address, or URL associated with a POI. For example, if the POI is a restaurant, the POI information may include a name, location, and/or address of the restaurant, as well as a URL of the restaurant's web page.

In step 102, a document associated with the URL may be retrieved. For example, a web page may be retrieved from the Internet using the URL. In one embodiment, the retrieved web page may be crawled or analyzed for URL links to additional documents and those documents may also be retrieved. For example, additional web pages may be retrieved from links on each web page up to a certain page "depth." For example, a "depth" of 1 may only retrieve the web page referenced by the URL provided in the POI information and web pages from URLs linked directly on the referenced web page.

In step 103, text from a document may be parsed or "scraped" to identify a set of character strings. For example, some programming languages, such as PHP, provide for easy determination of terms from a sequence of text and may be used to identify the character strings. Alternatively, the text from the document may be broken into character strings by tokenizing the text based on a predetermined character delimiter, such as a punctuation mark or a space. In one embodiment, the text may first be tokenized into sentences based on one or more punctuation mark delimiters. These tokenized sentences may then be tokenized into sequences of character strings, such as words, terms, or phrases. The sentences may be tokenized info sequences of character strings based on a delimiter, such as a space, and/or based on known combinations of words, such as predetermined phrases of one or more words. The sequence of each character string within each sentence may be stored for identifying one or more pads of speech of each character string, as further discussed herein. Once the set of character strings has been identified, the method may proceed to step 104.

In step 104, a subset of character strings may be isolated from the set of character strings. For example, web server(s) or computer system(s) may include programmed instructions for automatically determining character strings of the set of character strings to omit in order to isolate the subset of character strings. Various approaches may be taken to isolate the subset of character strings, as further discussed below.

In step 105, a character string may be identified as important from the subset of character strings based on a determination of how frequently the character string appears in a document, such as the web page, or in a collection of documents, such as in a collection of web pages. One of skill in the art will recognize that there are many known techniques for determining an importance of a term in a document or in a collection of documents. For example, an inverse document frequency score may be used to determine an importance of the character string. An inverse document frequency score may be calculated based on how frequently a character string appears in a collection of documents. Inverse document frequency scoring may operate on the assumption that character strings that appear less frequently within a collection of documents are more important. Thus, character strings that do not appear frequently within the collection may be given high scores, and character strings that do appear frequently within the collection may be given low scores.

While inverse document frequency scoring is discussed above, one of skill in the art will recognize that other known techniques may be used, alone or in combination with inverse document frequency scoring, to determine an importance of a term in a document or in a collection of documents. For example, within a single document, a term frequency scoring approach may be used. Term frequency scoring may operate on the assumption that character strings that appear more frequently within a document are more important. Thus, character strings that appear frequently within the document may be given high scores, and character strings that do not appear frequently within the document may be given low scores.

In one embodiment, a combination of term frequency scoring and inverse document frequency scoring may be used. This approach may operate on the assumption that a character string that appears more frequently within a document is more important, so long as the character string is not common across the English language or across a particular collection of documents. Thus, character strings that appear frequently within a small number of documents may receive high scores, while character strings that occur frequently within a majority of the documents may receive low scores. This approach may allow method 100 to assume that terms that occur frequently within a document are descriptive of the content of the document, while controlling for words that frequently appear within the English language or within a collection of documents. For example, the word "review" may occur frequently within a web page for POI, but may receive a low score upon determining that the word "review" commonly occurs in many web pages for POIs.

Referring again to the exemplary embodiment of FIG. 1, if the score of the character string meets or exceeds a predetermined threshold, the character string may be identified and method 100 may proceed to step 106. In one embodiment, the predetermined threshold may be configurable by an operator. Alternatively, the predetermined threshold may be configured to pass a certain percentage of character strings in the subset of character strings to step 106 of method 100. In one embodiment, each of the character strings in the subset of character strings may be assigned a score based on one of the above approaches, and each character string in the subset meeting or exceeding the predetermined threshold may be identified.

In step 106, the character string identified in step 105 may be stored in a searchable index of POI information corresponding to the POI. In one embodiment, each of the character strings identified in step 105 may be stored in the searchable index of POI information corresponding to the POI.

Figure 2:
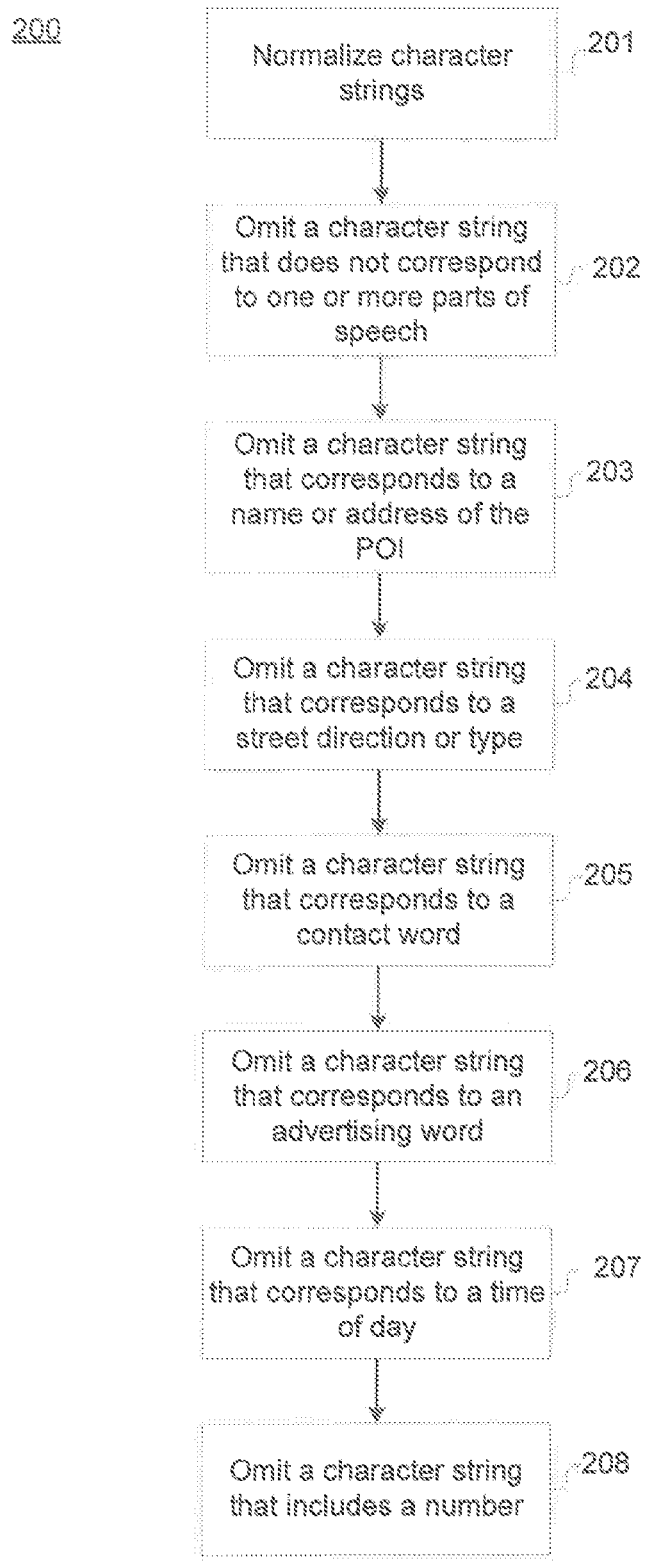
FIG. 2 illustrates an exemplary method for determining whether to omit a character string from a subset of character strings, consistent with embodiments of the present disclosure.

FIG. 2 illustrates an exemplary method 200 for automatically isolating a subset of character strings from the set of character strings, consistent with embodiments of the present disclosure. Similar to method 100, exemplary method 200 may be implemented in a computing environment using one or more computer systems. Further, method 200 may be implemented on the same or different web sever(s) or computer system(s) associated with the other exemplary methods disclosed herein, including method 100. Moreover, step 104 of method 100 may be performed utilizing method 200, for example.

In step 201, one or more character strings in the set may be normalized into a standard format. This may involve one or more of, for example, changing all capitalized characters to lower case characters, removing punctuation, or removing one or more character accents or diacritics. A character string such as "Mozzarella?" may be normalized to "mozzarella", for example. Normalizing one or more character strings may make it easier for the system to identify whether a character string should be omitted consistent with one or more of the steps of method 200. In one embodiment, each of the character strings in the set may be normalized to identify whether any of the character strings should be omitted consistent with one or more of the steps of method 200.

In step 202, a character string in the set may be analyzed to determine a part of speech corresponding to the character string. The part of speech may be determined from a set including, but not limited to, one or more of a noun, verb, article, adjective, preposition, pronoun, adverb, conjunction, interjection, or any other part of speech used in part of speech tagging. For example, a database could store words and corresponding parts of speech, and the character string could be compared with the words in the database to identify the corresponding parts of speech. If the character string matches a word in the database, the part of speech corresponding to the word could be associated, or tagged, to the character string.

As previously noted with respect to method 100, the sequence of a character string in a sentence in a retrieved document may be stored for determining the part of speech. The sequence may be used to determine a context of the character string in the sentence. This may be useful in situations where a word may represent more than one part of speech depending on its context in a sentence. One of skill in the art would recognize that there are many known methods for part of speech tagging, such as through use of Markov Models, that could be used in step 202 to identify a part of speech for the character string. In one embodiment, each of the character strings in the set may be associated with at least one part of speech to identify whether any of the character strings should be omitted consistent with one or more of the steps of method 200.

Once a particular part of speech has been associated with the character string, the character string may be omitted based on the part of speech. In one embodiment, only character strings associated with one or more particular parts of speech may be retained, while the rest of the character strings in the set are omitted. For example, step 202 may retain any character string associated with a noun or verb part of speech, and may omit the remainder of the character strings. Alternatively, step 202 may omit character strings based on one or more particular parts of speech, and may retain the remainder of the character strings in the set. For example, step 202 may omit any character string associated with a pronoun or adjective part of speech and retain the remainder of the character strings.

In step 203, a character string retained from step 202 of method 200 may be analyzed to determine whether the character string corresponds to a term or phrase received in the POI information. For example, the character string may be compared to a term or phrase that was received in the POI information, such as the name or address of the POI. If the character string corresponds to a term or phrase in the POI information, the character string may be omitted. In one embodiment, all of the retained character strings may be analyzed to determine whether each retained character string corresponds to a term or phrase received in the POI information and each retained character string that corresponds to a term or phrase in the POI information may be omitted.

In step 204, a character string retained from step 203 of method 200 may be analyzed to determine whether the character string corresponds to a street direction or street type. For example, the character string could be compared with a database of words or phrases corresponding to a street direction (e.g., n, s, e, w, nw, north, east) and/or corresponding to street type (e.g., street, avenue, boulevard, court, st, ave, blvd, ct). If the character string corresponds to a term or phrase corresponding to a street direction and/or street type in the database, the character string may be omitted. In one embodiment, all of the character strings retained from step 203 of method 200 may be analyzed to determine whether each retained character string corresponds to a term or phrase representing a street direction and/or street type in the database and each retained character string that corresponds to a term or phrase representing a street direction and/or street type in the database may be omitted.

In step 205, a character string retained from step 204 of method 200 may be analyzed to determine whether the character string corresponds to a contact word. Contact words may include, for example, "call", "phone", "telephone", "tel", "fax", "email", "facebook", "twitter", or any other term or phrase representing a way of contacting a person or entity. The character string may be compared with a database of terms or phrases corresponding to contact words. If the character string corresponds to a term or phrase representing a contact word in the database, the character string may be omitted. In one embodiment, all of the character strings retained from step 204 of method 200 may be analyzed to determine whether each retained character string corresponds to a term or phrase representing a contact word in the database and each retained character string that corresponds to a term or phrase representing a contact word in the database may be omitted.

In step 206, a character string retained from step 205 of method 200 may be analyzed to determine whether the character string corresponds to an advertising word. Advertising words may include, for example, "google", "adsense", "ghostery", "analytics", or any other term or phrase representing advertising. The character string could be compared with a database of terms or phrases representing advertising words. If the character string corresponds to a term or phrase representing an advertising word in the database, the character string may be omitted. In one embodiment, all of the character strings retained from step 205 of method 200 may be analyzed to determine whether each retained character string corresponds to a term or phrase representing an advertising word in the database and each retained character string that corresponds to a term or phrase representing an advertising word in the database may be omitted.

In step 207, a character string retained from step 206 of method 200 may be analyzed to determine whether the character string corresponds to a term or phrase representing a time of day. Terms or phrases representing a time of day may include, for example, "am", "pm", "noon", "afternoon", "evening", "morning", "midnight", or any other term or phrase representing a time of day. The character string could be compared with a database of terms or phrases representing a time of day. If the character string corresponds to a term or phrase representing a time of day in the database, the character string may be omitted. In one embodiment, all of the character strings retained from step 206 of method 200 may be analyzed to determine whether each retained character string corresponds to a term or phrase representing a time of day in the database and each retained character string that corresponds to a term or phrase representing a time of day in the database may be omitted.

In step 208, a character string retained from step 207 of method 200 may be analyzed to determine whether the character string contains a numerical character, such as, but not limited to, "0", "1", "5", "9", or any other character representing a number. Each character of the character string could be compared with a database of characters representing numbers. If the character string contains a character representing a number, the character string may be omitted. In one embodiment, all of the character strings retained from step 207 of method 200 may be analyzed to determine whether each retained character string contains a character representing a number in the database and each retained character string that contains a character representing a number in the database may be omitted.

After method 200 has completed, a subset of character strings may remain. The subset of character strings may include the character strings that were retained from the set of character strings and that were not omitted in one of the steps of method 200. Once method 200 has completed and the subset of character strings has been determined, the method may proceed to step 105 of method 100, for example.

With regards to the comparisons discussed above, the words "corresponds" or "corresponding" should be taken to mean that the character string matches, substantially matches, or matches a term that has been predetermined to match. For example, a "corresponding" character string may identically match the character sequence of a term or phrase in the database, may substantially match the character sequence of a term or phrase in the database (e.g., may match the term or phrase with the exception of a predetermined number of characters), or may match a predetermined synonym of the character string.

While the above description describes performing each of steps 201-208 to obtain the subset of character strings, the description is not so limited. Performing the steps of method 200 may reduce the number of character strings to consider for inclusion in an index for a POI by removing character strings that are not likely to be particularly relevant in future searches. That is, method 200 may eliminate "noise" for step 105 of method 100. However, it will be appreciated that any of steps 201-208 may be removed, but may result in a greater amount of "noise" in step 105. It will also be appreciated that additional steps may be added to method 200 to further omit any additional character strings that are likely to be irrelevant in future user queries.

It will also be appreciated that, while the above description describes method 200 as being performed in a particular sequence of steps 201-208, the description is not so limited. The steps of method 200 may be performed in any order. Alternatively, each of the steps of method 200 may be performed in parallel through use of multiple processors. In one embodiment, each step of method 200 may be applied to every character string retained from the prior step of method 200 before moving to the next step of method 200. Alternatively, all of the steps of method 200 may be applied to a character string in the set before any of the steps of method 200 are applied to another character string in the set. Furthermore, it will be appreciated that the above described steps of method 100 are also not limited. Additions, subtractions, and modifications can be made to the steps of method 100 for similar reasons to that noted above.

Figure 3:
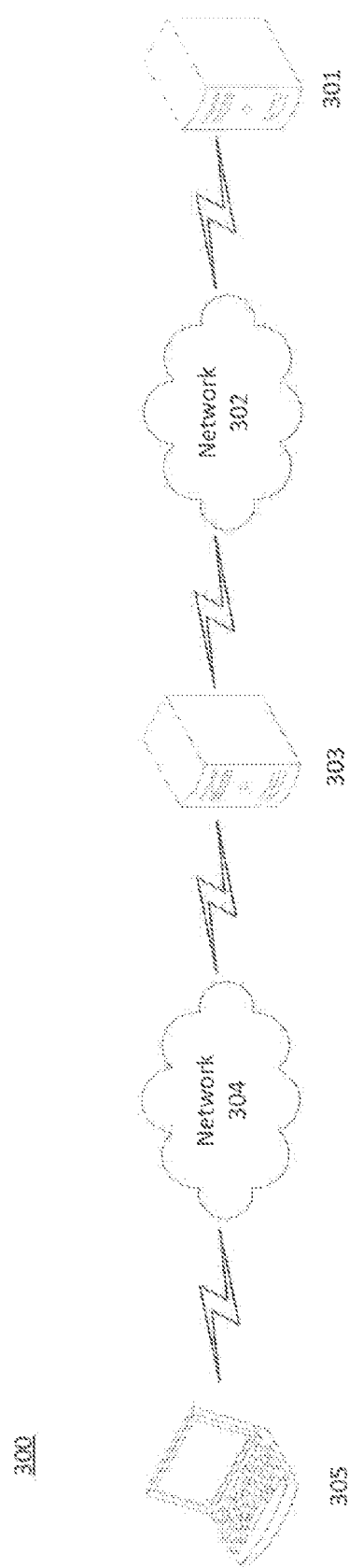
FIG. 3 illustrates an exemplary computing environment for implementing embodiments and features consistent with the present disclosure.

FIG. 3 is a diagram illustrating an exemplary computing environment 300 for implementing embodiments consistent with the present disclosure, including the above-described exemplary methods and features. In computing environment 300, a service provider or other entity may provide one or more computer system(s) 303 that enable query and information retrieval services. By way of example, computer system(s) 303 may include one or more web servers or other computing platforms for hosting web pages and/or software applications that handle and process user queries, or that provide searchable POI information to one or more client devices 305. Computer system(s) 303 may also include one or more back-end servers for analyzing one or more documents associated with a POI consistent with the above-described exemplary methods and features. Computer system(s) 303 may also include one or more back-end servers for processing queries from users of client devices 305. In one embodiment, computer system(s) 303 may be implemented using exemplary computer system 400 of FIG. 4.

A network 302 may connect computer system(s) 303 with one or more data provider(s) 301. Network 302 may provide for the exchange of POI information, such as a name, address, location, and/or a URL associated with one or more POIs, between data provider(s) 301 and computer system(s) 303. Network 302 may include one or more types of networks interconnecting computer system(s) 303 with data provider(s) 301. For example, one data provider 301 may communicate with one or more computer system(s) 303 over a fiber optic network, while a different data provider 301 may communicate with one or more computer system(s) 303 over a cellular and/or other wireless network. Network 302 may include one or more wide area networks (WANs), metropolitan area networks (MANs), local area networks (LANs), or any combination of these networks. Network 302 may include a combination of a variety of different network types, including internet, Ethernet, twisted-pair, coaxial cable, fiber optic, mobile, cellular, satellite, IEEE 802.11, terrestrial, and/or other types of network connections, in some embodiments, network 302 comprises the Internet.

Data provider(s) 301 may include a variety of different types of computing devices capable of compiling POI information. In one embodiment, data provider(s) 301 may include a variety of different types of computing devices capable of communicating with computer system(s) 303 over network 302. These computing devices may include servers, personal computers, laptops, and/or other types of computing devices. A data provider 301 may use more than one type of computing device to communicate with computer system(s) 303. In one embodiment, data provider(s) 301 may be implemented using exemplary computer system 400 of FIG. 4.

Alternatively, data providers) 301 may provide POI information to a service provider through the mall, such as in a catalog or on a CD-ROM. The service provider may then enter the POI information from the catalog or from the CD-ROM onto computer system(s) 303 for implementing embodiments consistent with the present disclosure, including the above-described exemplary methods and features.

While the above disclosure describes data provider(s) 301 as compiling and providing POI information, the disclosure is not so limited. For example, it will be appreciated that one or more aspects of the methods of FIGS. 1 and 2 may be carried out by data provider(s) 301, and that data provider(s) 301 may provide POI information that includes additional character strings identified from carrying out the methods of FIGS. 1 and 2.

A network 304 may connect computer system(s) 303 with one or more client device(s) 305. Network 304 may provide for the exchange of information between client device(s) 305 and computer system(s) 303. In one embodiment, network 304 may provide for the exchange of queries and results between client device(s) 305 and computer system(s) 303. For example, a user of client device 305 may submit a query for a POI over network 304 using a web page provided by computer system(s) 303. In response, computer system(s) 303 may search for POI information stored at computer system(s) 303 that corresponds to the user's query, and may provide corresponding POI information over network 304 for display on the client device 305.

In another embodiment, network 304 may provide for the exchange of POI information between computer system(s) 303 and client device(s) 305. For example, the POI information may be provided to a client device 305 for performing local searches on the POI information at the client device 305. This may allow a client device 305, such as a GPS device for an automobile, to search the POI information without having to access the POI information over a network.

Network 304 may include one or more types of networks interconnecting computer system(s) 303 with client device(s) 305. For example, one client device 305 may communicate with one or more computer system(s) 303 over a coaxial cable network, while a different client device 305 may communicate with one or more computer system(s) 303 over a cellular network. Network 304 may include one or more wide area networks (WANs), metropolitan area networks (MANs), local area networks (LANs), or any combination of these networks. Network 304 may include a combination of a variety of different network types, including Internet, Ethernet, twisted-pair, coaxial cable, fiber optic, mobile, cellular, satellite, IEEE 802.11, terrestrial, and/or other types of network connections. In some embodiments, network 304 comprises the Internet.

Client devices 305 may include a variety of different types of computing devices capable of communicating with computer system(s) 303 over network 304. These computing devices may include personal computers, laptops, GPS devices, navigation devices, personal digital assistants (PDAs), telephones, televisions, set-top boxes, mobile phones, smart-phones, tablet computers, servers, and/or other types of computing devices. A user may use more than one type of client device to communicate with computer system(s) 303. In one embodiment, client device(s) 305 may be implemented using exemplary computer system 400 of FIG. 4.

Figure 4:
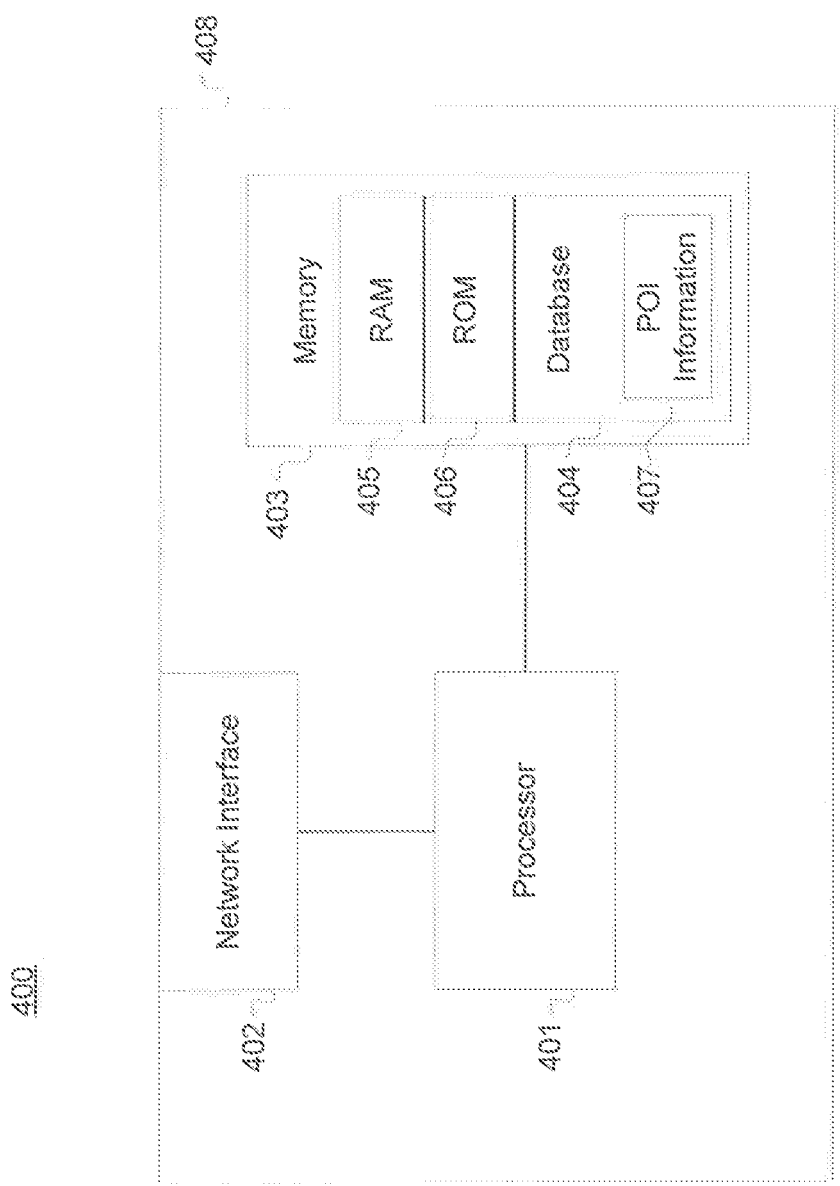
FIG. 4 illustrates an exemplary computer system for implementing embodiments and features consistent with the present disclosure.

FIG. 4 is a diagram illustrating an exemplary computer system 400 that may be used for implementing embodiments consistent with the present disclosure, including the exemplary systems, devices, and methods described herein, including those described with reference to FIGS. 1-3. For example, computer system 400 may be used to implement one or more of computer system(s) 303, client device(s) 305, or data provider(s) 301. Computer system 400 may include one or more computers 408, which may be servers, personal computers, and/or other types of computing devices. Each computer 408 may include one or more processor 401 that may be any suitable type of processor. Processor 401 may be coupled to a network interface 402 for receiving and/or transmitting data and/or commands to/from other devices over a variety of networks, such as Internet, Ethernet, twisted-pair, coaxial cable, fiber optic, mobile, cellular, satellite, IEEE 802.11, terrestrial, or other wired or wireless networks.

Processor 401 may be coupled to one or more memory device(s) 403. Each memory device 403 may be configured to store instructions that, when executed by one or more processors 401 carry out the methods and techniques consistent with the present disclosure, including the exemplary methods and techniques described herein. Memory device 403 may also store an operating system, software applications, and/or parameters. Data stored on memory device 403 may be stored in a single dedicated memory, or over a plurality of memory devices. Memory device 403 may include any type of memory, physical, non-transient, volatile, or non-volatile, including, but not limited to, random access memory (RAM) 405, read-only memory (ROM) 406, magnetic strip storage, semiconductor storage, optical disc storage, and/or magneto-optical disc storage.

Memory device 403 may also include one or more database(s) 404. Database(s) 404 may store words, terms, or phrases for implementing the steps of method 200, and/or any other information or data stored as a result of performing the disclosed methods, or required to perform the disclosed methods. Database(s) 404 may also store POI information, such as one or more indexes of POI information 407, for providing to client(s) 305 or for implementing web-based services or applications consistent with the present disclosure. In one embodiment, database(s) 404 may store a collection of documents, such as web pages, and processor 401 may calculate an inverse document frequency score and/or term frequency score based on the collection of documents. Alternatively, database(s) 404 may store a list of inverse document frequency scores and/or term frequency scores that were calculated and received from another source. Processor 401 may also be coupled to a computer providing a user interface for allowing input of information and commands to processor 401 and/or for allowing output of information and commands in a human-readable form.

As disclosed herein, POI information, including a URL associated with the POI, may be received from one or more data providers. One of more documents associated with the URL may be retrieved and the text from the one or more documents may be parsed to obtain a set of character strings. Character strings may be omitted from the set using method 200 to obtain a subset of character strings, as described herein. Of the character strings in the subset, the most important character strings may be identified, associated with the POI, and stored in an index of POI information.

Thus, using one or more of methods 100 or 200, as described herein, additional character strings, such as terms, phrases, or keywords, may be associated with a POI to provide additional relevant information for identifying the POI in future queries or searches.

The disclosed systems and methods provide a useful way of identifying and associating additional structured information with POI information. Using the systems and methods disclosed herein, a web page associated with a POI, such as a restaurant for example, may be crawled, and character strings from an online menu on the web page can be associated with the POI for future user queries. For example, a user could query for "French Fries" and receive results including POIs that carry "French Fries" on the menu. Thus, the systems and methods disclosed herein greatly enhance the ability of a user to identify relevant POIs from a POI query.

While the above description discusses identifying one or more character strings in the context of POIs, it will be appreciated that the embodiments and features of this disclosure may be applied in other contexts. That is, the embodiments and features of this disclosure may be applied for any subject of interest (SOI), such as any person, place, or thing. For example, information relating to a person, such as George Washington, may be received, and this information may include a URL to a webpage with information about George Washington. The embodiments and features of this disclosure may be used to analyze the text of the webpage and identify additional useful information to associate with George Washington for use in future searches. For example, the phrase "Mount Vernon" may be identified and associated with George Washington for use in future searches. Similarly, information relating to an item, such as a book, may be received, and this information may include a URL to a webpage with information about the item. Using the embodiments and features of this disclosure, the webpage may be analyzed and additional terms or phrases representing the author's name and/or publisher, for example, may be associated with the book for use in future searches.

The many features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method, comprising:
   receiving, by a device, information associated with a point of interest,
      the information including a uniform resource locator (URL);
   parsing, by the device, text from a document associated with the URL,
      the parsed text including a set of character strings;
   isolating, by the device, a subset of character strings from the set of character strings by omitting at least a first character string of the set of character strings based on comparing the set of character strings to a database to identify a term or phrase that corresponds to the first character string,
      the database comprising a plurality of terms or phrases to be omitted,
         the plurality of terms or phrases including the term or phrase;
   identifying, by the device, a second character string in the subset of character strings that has an associated score that satisfies a threshold; and
   associating, by the device, the second character string with searchable information for the point of interest.

2. The method of claim 1, where isolating the subset of character strings comprises:
   isolating the subset of character strings by omitting the first character string from the subset of character strings based on the first character string corresponding to at least one of a name or an address of the point of interest.

3. The method of claim 1, where the plurality of terms or phrases of the database comprises a term or phrase representing at least one of a street direction or a street type; and
   where isolating the subset of character strings comprises:
      isolating the subset of character strings by omitting the first character string from the subset of character strings based on the first character string corresponding to the term or phrase representing at least one of the street direction or the street type.

4. The method of claim 1, where isolating the subset of character strings comprises:
   isolating the subset of character strings by omitting the first character string from the subset of character strings based on the first character string not corresponding to a noun or a verb.

5. The method of claim 1, where the plurality of terms or phrases of the database comprises a term or phrase representing a number; and
   where isolating the subset of character strings comprises:
      isolating the subset of character strings by omitting the first character string from the subset of character strings based on the first character string corresponding to the term or phrase representing the number.

6. The method of claim 1, where the plurality of terms or phrases of the database comprises a term or phrase representing a contact word; and
   where isolating the subset of character strings comprises:
      isolating the subset of character strings by omitting the first character string from the subset of character strings based on the first character string corresponding to the term or phrase representing the contact word.

7. The method of claim 1, where the plurality of terms or phrases of the database comprises a term or phrase representing an advertising word; and
   where isolating the subset of character strings comprises:
      isolating the subset of character strings by omitting the first character string from the subset of character strings based on the first character string corresponding to the term or phrase representing the advertising word.

8. The method of claim 1, where the plurality of terms or phrases of the database comprises a term or phrase representing a time of day; and
   where isolating the subset of character strings comprises:
      isolating the subset of character strings by omitting the first character string from the subset of character strings based on the first character string corresponding to the term or phrase representing the time of day.

9. The method of claim 1, where the associated score is an inverse document frequency score; and
where identifying the second character string in the subset of character strings comprises:
identifying the second character string in the subset of character strings based on the inverse document frequency score of the second character string satisfying the threshold.

10. A device, comprising:
a memory; and
at least one processor, communicatively coupled to the memory, to:
receive information associated with a point of interest, the information including a uniform resource locator (URL);
parse text from a document associate with the URL, the parsed text including a set of character strings;
isolate a subset of character strings from the set of character strings by omitting at least a first character string of the set of character strings based on comparing the set of character strings to a database to identify a term or phrase that corresponds to the first character string,
the database comprising a plurality of terms or phrases to be omitted,
the plurality of terms or phrases including the term or phrase;
identify a second character string in the subset of character strings that has an associated score that satisfies a threshold; and
associate the second character string with searchable information for the point of interest.

11. The device of claim 10, wherein the at least one processor, when isolating the subset of character strings, is to:
isolate the subset of character strings by omitting the first character string from the subset of character strings based on the first character string corresponding to at least one of a name or an address of the point of interest.

12. The device of claim 10, where the plurality of terms or phrases of the database comprises a term or phrase representing at least one of a street direction or a street type; and
where the at least one processor, when isolating the subset of character strings, is to:
isolate the subset of character strings by omitting the first character string from the subset of character strings based on the first character string corresponding to the term or phrase representing at least one of the street direction or the street type.

13. The device of claim 10, wherein the at least one processor, when isolating the subset of character strings, is to:
isolate the subset of character strings by omitting the first character string from the subset of character strings based on the first character string not corresponding to a noun or a verb.

14. The device of claim 10, where the plurality of terms or phrases of the database comprises a term or phrase representing a number; and
where the at least one processor, when isolating the subset of character strings, is to:
isolate the subset of character strings by omitting the first character string from the subset of character strings based on the first character string corresponding to the term or phrase representing the number.

15. The device of claim 10, where the plurality of terms or phrases of the database comprises a term or phrase representing a contact word; and
where the at least one processor, when isolating the subset of character strings, is to:
isolate the subset of character strings by omitting the first character string from the subset of character strings based on the first character string corresponding to the term or phrase representing the contact word.

16. The device of claim 10, where the plurality of terms or phrases of the database comprises a term or phrase representing an advertising word; and
where the at least one processor, when isolating the subset of character strings, is to:
isolate the subset of character strings by omitting the first character string from the subset of character strings based on the first character string corresponding to the term or phrase representing the advertising word.

17. The device of claim 10, where the plurality of terms or phrases of the database comprises a term or phrase representing a time of day; and
where the at least one processor, when isolating the subset of character strings, is to:
isolate the subset of character strings by omitting the first character string from the subset of character strings based on the first character string corresponding to the term or phrase representing the time of day.

18. The device of claim 10, where the associated score is an inverse document frequency score; and
where the at least one processor, when identifying the second character string in the subset of character strings, is to:
identify the second character string in the subset of character strings based on the inverse document frequency score of the second character string satisfying the threshold.

19. A non-transitory computer-readable medium storing instructions, the instructions comprising:
one or more instructions that, when executed by at least one processor, cause the at least one processor to:
receive information associated with a point of interest, the information including a uniform resource locator (URL);
parse text from a document associated with the URL, the parsed text including a set of character strings;
isolate a subset of character strings from the set of character strings by omitting at least a first character string of the set of character strings based on comparing the set of character strings to a database to identify a term or phrase that corresponds to the first character string,
the database comprising a plurality of terms or phrases to be omitted,
the plurality of terms or phrases including the term or phrase;
identify a second character string in the subset of character strings that has an associated score that satisfies a threshold; and
associate the second character string with searchable information for the point of interest.

20. The non-transitory computer-readable medium of claim 19, where the plurality of terms or phrases of the database comprises a term or phrase representing at least one of:
   a street direction or a street type,
   a number,
   a contact word,
   an advertising word, or
   a time of day; and
   where the one or more instructions, that cause the at least one processor to isolate the subset of character strings, cause the at least one processor to:
   isolate the subset of character strings by omitting the first character string from the subset of character strings based on the first character string corresponding to the term or phrase representing at least one of:
     the street direction or the street type,
     the number,
     the contact word,
     the advertising word, or
     the time of day.

\* \* \* \* \*